B. F. STEWART.
ROTARY CULTIVATOR OR HARROW.
APPLICATION FILED MAY 25, 1908.
899,632.
Patented Sept. 29, 1908.
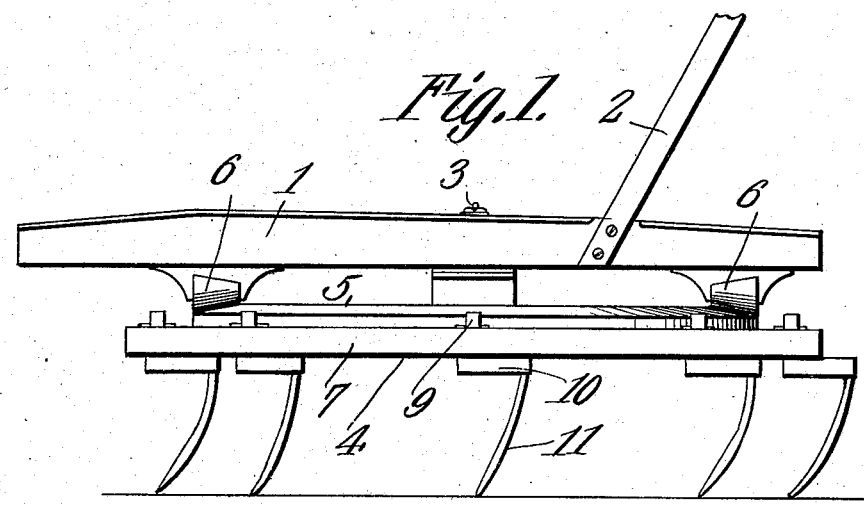
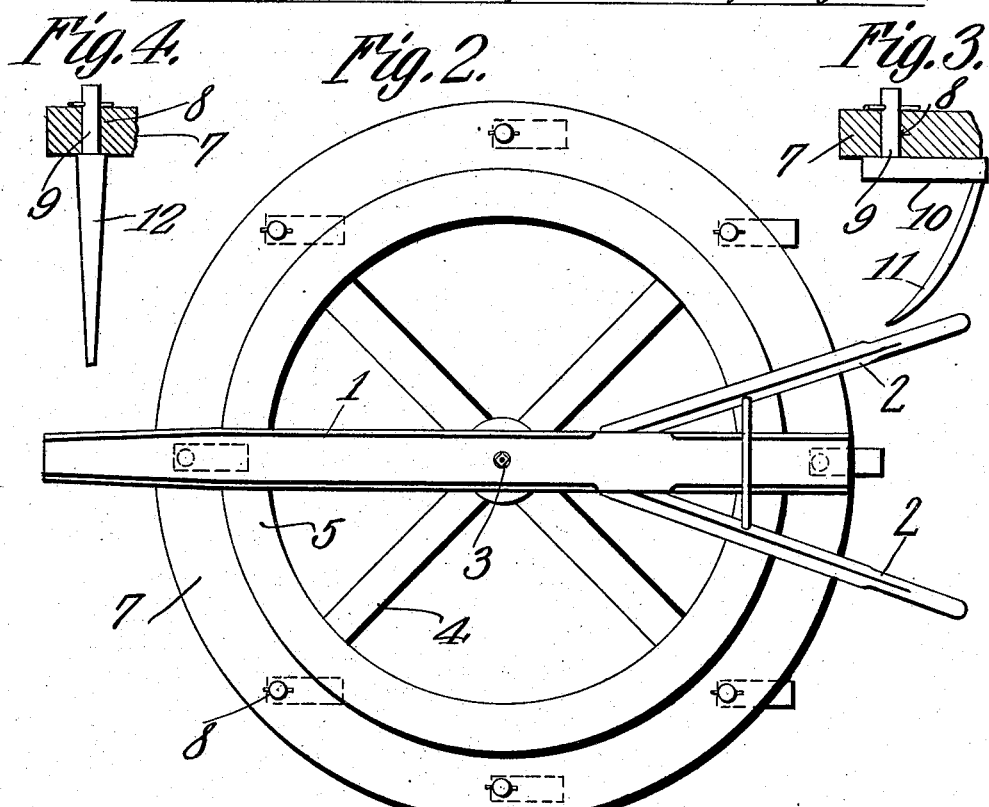
Witnesses
Inventor
Benjamin F. Stewart.
By
Attorneys

UNITED STATES PATENT OFFICE.

BENJAMIN F. STEWART, OF ANDALUSIA, ALABAMA.

ROTARY CULTIVATOR OR HARROW.

No. 899,632.  Specification of Letters Patent.  Patented Sept. 29, 1908.

Application filed May 25, 1908. Serial No. 434,929.

*To all whom it may concern:*

Be it known that I, BENJAMIN F. STEWART, a citizen of the United States, residing at Andalusia, in the county of Covington and State of Alabama, have invented a new and useful Rotary Cultivator or Harrow, of which the following is a specification.

This invention has relation to rotary cultivators or harrows and it consists in the novel construction and arrangement of its parts as hereinafter shown and described.

The object of the invention is to provide an implement of the character indicated which consists of a draft beam to which is journaled a wheel or disk and which is adapted to rotate in a substantially horizontal plane. Earth engaging members are pivotally supported at the peripheral portion of the said wheel and are adapted to have contact with the soil as the said wheel rotates. The said earth engaging members may be in the form of cultivator or harrow teeth. The wheel is provided at an intermediate portion with an annular ring and rollers are journaled upon the under side of the beam and are adapted to travel upon the said ring. The beam is also provided with suitable handles.

In the accompanying drawing:—Figure 1 is a side elevation of the implement. Fig. 2 is a top plan view of the same. Fig. 3 is a transverse sectional view of a portion of the rim of the wheel showing a cultivator tooth pivotally mounted therein, and Fig. 4 is a transverse sectional view of a portion of the wheel rim showing a harrow tooth pivoted therein.

The implement consists of the beam 1 to the rear end portion of which are attached the handles 2. The said beam 1 is provided at an intermediate point with the spindle 3 upon which is journaled the wheel 4. The said wheel 4 occupies a plane below the beam 1 and is adapted to rotate in a substantially horizontal plane. The wheel 4 is provided at its intermediate portion with an annular ring or track 5 which is slightly beveled as shown in Fig. 1 of the drawing. The rollers 6 are journaled upon the under side of the beam 1 and are adapted to travel over the upper surface of the ring or path 5. The said rollers 6 are slightly cone shape as shown in Fig. 1 of the drawing. The peripheral portion 7 of the wheel 4 is provided with a series of perforations or bearings 8. The shanks of the earth engaging members are journaled for rotation in the said perforations or bearings 8.

The form of earth engaging member as shown in Fig. 3 is adapted to be used for cultivating soil and the said member consists of the shank 9 which is journaled in the perforation 8 and which merges into the shoulder portion 10 which is adapted to lie under the peripheral portion 7 of the wheel 4. The tooth portion 11 depends from the rear end of the shoulder portion 10 and the lower end of the tooth portion 11 is in vertical alinement with the axis of the shank portion 9.

In the form of earth engaging member as shown in Fig. 4 the said member consists of the shank portion 9 which is journaled in the bearing of perforation 8 of the peripheral portion 7 of the wheel 4 and which merges into the tooth portion 12. In this form of the invention the tooth portion 12 is in alinement with the axis of the shank portion 9.

When the implement is used as a cultivator the wheel 4 is equipped with the form of earth engaging members as shown in Fig. 3 and when so equipped and as the implement is drawn along the ground the wheel 4 is free to rotate and as the said wheel rotates the lower end portions of the tooth portions of the said members will always be disposed in a forward direction either in alinement with the draft beam 1 or in lines parallel therewith. This is due to the fact that the teeth portions 11 are mounted at the rear ends of the shoulders 10 and that the lower ends of the said teeth portions 11 are in vertical alinement with the axis of the shank portion 9. Thus the soil is cultivated in straight lines or by the cultivator teeth which are at all times disposed in alinement or parallel with the line of draft of the implement and consequently the soil is not unduly scattered or displaced. When the implement is used as a harrow the wheel 4 is equipped with the form of earth engaging members as shown in Fig. 4, and as the said members are free to rotate in the bearings or perforations 8 they are less liable to accumulate trash than if they were fixed in their positions with relation to the wheel 4.

Having described my invention what I claim as new and desire to secure by Letters-Patent is:—

An implement as described comprising a draft beam, a wheel journaled for rotation with relation to the beam and adapted to rotate in a substantially horizontal plane, earth engaging members journaled to the peripheral portion of said wheel and consisting of shanks journaled to the wheel, and shoulder portions located below the wheel and teeth portions depending from the rear ends of the shoulder portions and having their lower ends in vertical alinement with the axis of the said shanks.

In testimony that I claim the foregoing as my own, I have hereto affixed my signature in the presence of two witnesses.

BENJAMIN F. STEWART.

Witnesses:
B. F. WHIDBY,
BENJ. F. PARKER.